United States Patent
Conlon et al.

(10) Patent No.: US 8,924,481 B2
(45) Date of Patent: Dec. 30, 2014

(54) APPARATUS FOR ROUTING REQUESTS

(75) Inventors: Declan Sean Conlon, Cambridge (GB); Gaurav Ghildyal, Cambridge (GB)

(73) Assignee: Riverbed Technology, Inc., San Francisco, CA (US)

( * ) Notice: Subject to any disclaimer, the term of this patent is extended or adjusted under 35 U.S.C. 154(b) by 872 days.

(21) Appl. No.: 13/115,692

(22) Filed: May 25, 2011

(65) Prior Publication Data
US 2011/0295953 A1  Dec. 1, 2011

(51) Int. Cl.
*G06F 15/16* (2006.01)
*H04L 29/08* (2006.01)

(52) U.S. Cl.
CPC .................................. *H04L 67/1002* (2013.01)
USPC ........... 709/205; 709/203; 718/102; 718/103; 718/104; 718/105

(58) Field of Classification Search
CPC ..... H04L 47/70; H04L 63/10; H04L 41/5003; H04L 67/1002
USPC ............................ 709/203, 205; 718/102–105
See application file for complete search history.

(56) References Cited

U.S. PATENT DOCUMENTS

| | | | |
|---|---|---|---|
| 6,230,183 B1 * | 5/2001 | Yocom et al. ................. | 718/105 |
| 6,816,907 B1 * | 11/2004 | Mei et al. ...................... | 709/229 |
| 7,246,167 B2 * | 7/2007 | Kalmuk et al. ................ | 709/227 |
| 7,676,035 B2 * | 3/2010 | Werth et al. .............. | 379/266.09 |
| 7,712,103 B2 * | 5/2010 | Takahisa ....................... | 718/105 |
| 7,730,186 B2 * | 6/2010 | Lai ................................. | 709/226 |
| 8,145,761 B2 * | 3/2012 | Liu et al. ....................... | 709/226 |
| 8,245,238 B2 * | 8/2012 | Neubauer et al. ............. | 718/105 |
| 2002/0055980 A1 * | 5/2002 | Goddard ....................... | 709/217 |
| 2002/0055982 A1 * | 5/2002 | Goddard ....................... | 709/217 |
| 2004/0111506 A1 * | 6/2004 | Kundu et al. .................. | 709/223 |
| 2004/0117794 A1 * | 6/2004 | Kundu .......................... | 718/102 |
| 2005/0038890 A1 * | 2/2005 | Masuda et al. ................ | 709/224 |
| 2007/0130313 A1 | 6/2007 | King | |
| 2009/0215541 A1 * | 8/2009 | Liu et al. ........................ | 463/42 |

* cited by examiner

*Primary Examiner* — Duyen Doan
(74) *Attorney, Agent, or Firm* — Park, Vaughan, Fleming & Dowler LLP

(57) ABSTRACT

Apparatus for routing requests from a plurality of connected clients to a plurality of connected servers comprises a processor, memory and a network interface. The processor is configured to run a plurality of identical processes, each being for receiving requests and connecting each received request to a server. For each process, the processor is configured to maintain a queue of requests in memory, determine a number of queued requests that may be connected to a server, and attempt to connect this number of queued requests. The processor then accepts further requests, and if the queue is not empty, places the further requests in the queue, and if the queue is empty, attempts to connect the further requests. The processor determines the number of queued requests that may be connected to a server in dependence upon the length of the queues of all the processes and the number of available connections.

14 Claims, 16 Drawing Sheets

APPARATUS FOR ROUTING REQUESTS

CROSS REFERENCE TO RELATED APPLICATIONS

This application claims priority from United Kingdom Patent Application No. 10 08 819.3, filed 26 May 2010, the entire disclosure of which is incorporated herein by reference in its entirety.

BACKGROUND OF THE INVENTION

1. Field of the Invention

The present invention relates to routing requests from a plurality of connected clients to a plurality of connected servers.

2. Description of the Related Art

Many situations arise in which a very large number of clients, possibly browsing the Internet, require access to a particular data source, such as a highly popular website. In order to serve data to many clients of this type, it is known to make the data available from many servers acting as a collection, with traffic management systems being used to even out loading in an attempt to optimise the available functionality.

Generally, this load balancing does not limit the number of connections to a server; instead, it simply maximises the number of requests across a set of servers.

A problem is encountered when the traffic management system receives a large number of simultaneous requests. By routing a large number of requests to a server, a concurrency threshold may be breached, and requests may become queued within a server until they can be allocated to a computation unit. In doing so, performance is reduced, as the servers must manage their queues whilst also serving the requests.

BRIEF SUMMARY OF THE INVENTION

According to an aspect of the present invention, there is provided apparatus for routing requests from a plurality of connected clients to a plurality of connected servers according to claim 1.

According to a second aspect of the present invention, there is provided a method of routing requests from a plurality of connected clients to a plurality of connected servers according to claim 8.

DETAILED DESCRIPTION OF EXAMPLE EMBODIMENTS

FIG. 1

Figure 1:
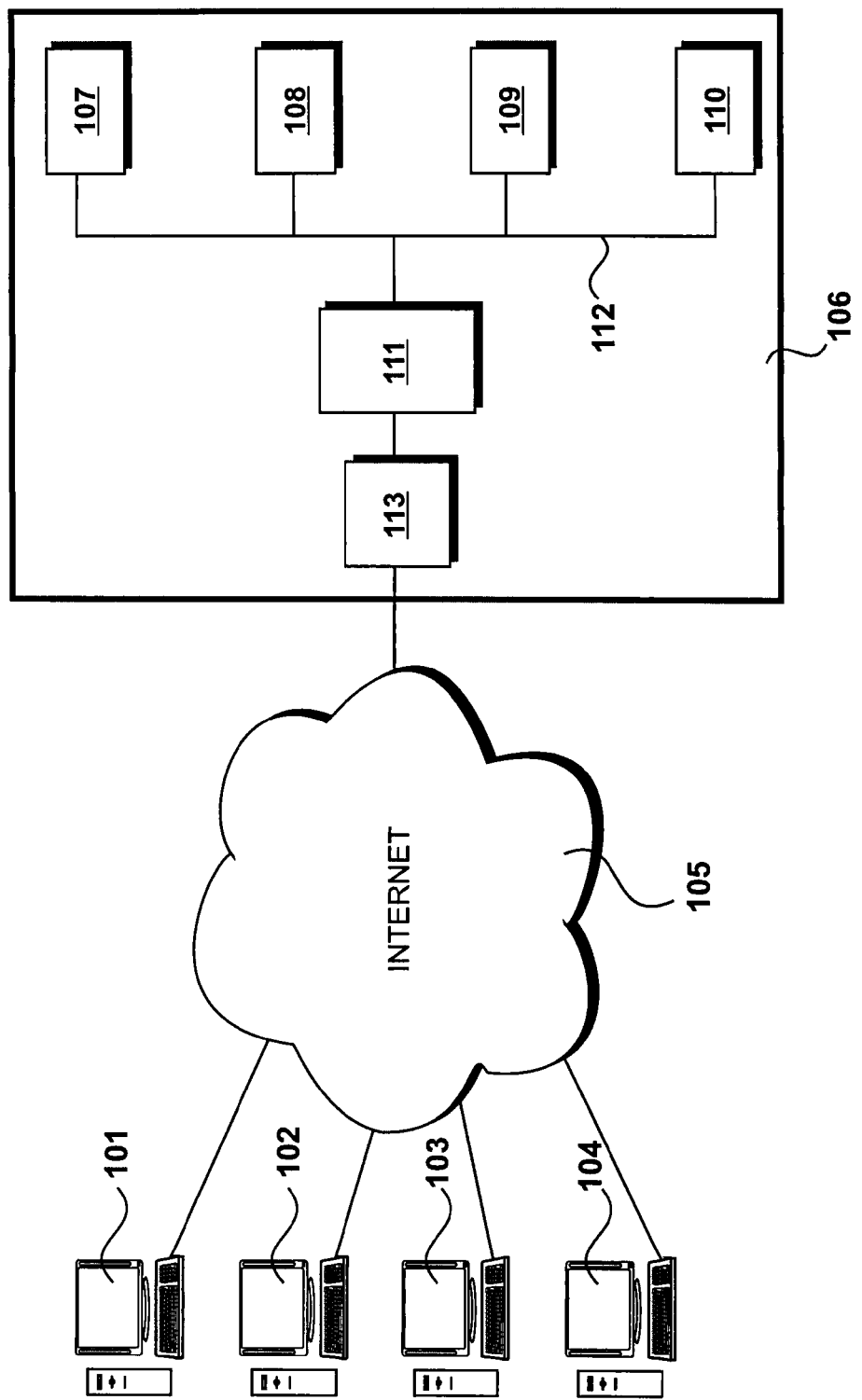
FIG. 1 illustrates an environment in which the invention may be embodied.

FIG. 1 illustrates an environment in which the invention may be implemented. A number of clients 101, 102, 103 and 104 are connected to Internet 105. Each of clients 101 to 104 is a device capable of connecting across a network to a service provider 106. For example, they may be desktop computers, laptops, mobile computing devices, or any other suitable computing device. In this example they connect across Internet 105, but they could be connecting to a local area network, a wide area network or some other type of network.

Service provider 106 comprises a number of servers 107, 108, 109 and 110. These all have access to the same data and respond to client requests in the same way, such that a request for data from any one of clients 101 to 104 can be routed to any one of clients 107 to 110 and be treated in exactly the same way. Servers 107 to 110 may be physically separate or may reside on one or more physical machines, and are connected by a local network 112.

In other embodiments the servers may be connected over any type of network, and would in fact be remote from each other. However, for performance reasons, it is preferable for the traffic manager and managed servers to be on a local network The routing of client requests to the servers is performed by a traffic manager 111. This receives requests over the Internet 105 from a client computer via a router 113 and uses load balancing algorithms to determine which server to send the request to.

In this example there are four servers and one traffic manager, but depending on the size of the service provider there may be many more servers and more traffic managers. Of utmost importance in such a system is the fast and reliable treatment of client requests, in order to avoid the user of a client perceiving low performance from service provider 106 and going elsewhere.

FIG. 2

Figure 2:
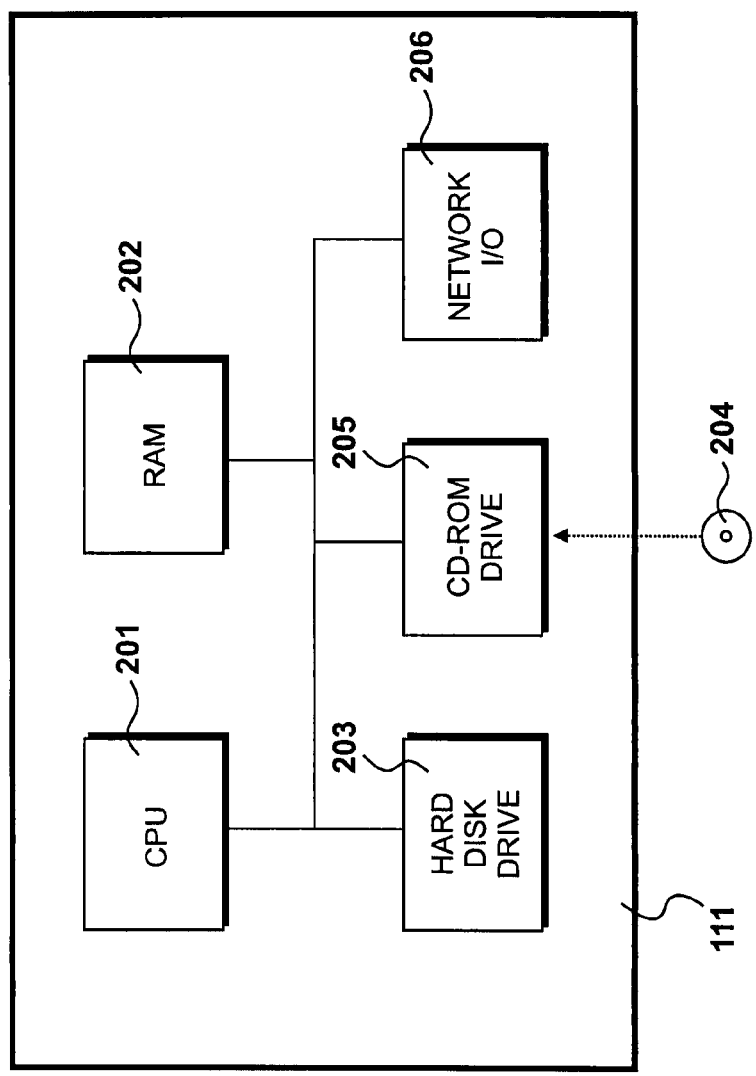
FIG. 2 is a diagram of a traffic manager shown in FIG. 1.

FIG. 2 shows traffic manager 111. It comprises a processor provided in this example by CPU 201, 8 gigabytes of RAM 202, and storage provided by a 1 terabyte hard disk drive 203.

Instructions may be loaded from a CD-ROM 204 by a CD-ROM drive 205, or alternatively they may be downloaded from a network via a network interface 206.

Network interface 206 also provides connectivity to the Internet 105 via router 113, and to local network 112, in order that traffic manager 111 may route requests between clients and the servers.

FIG. 3

Figure 3:
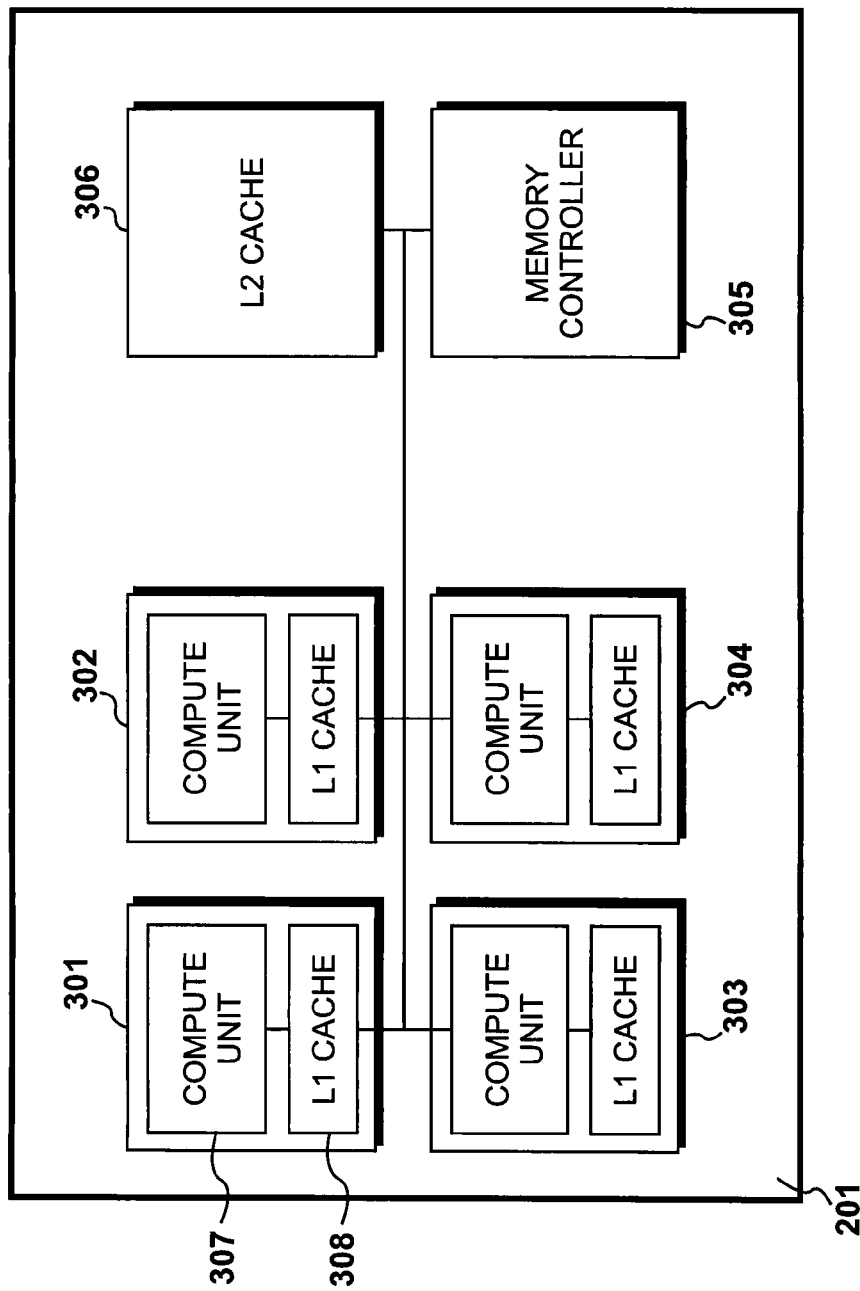
FIG. 3 is a diagram of a CPU shown in FIG. 2.

FIG. 3 details CPU 201. It contains four cores 301, 302, 303 and 304, along with a memory controller 305 and a level two cache 306.

Core 301 includes a compute unit 307 and a level one cache 308. The other cores are identical. Providing four cores in a single CPU allows up to four sets of instructions to be processed simultaneously by CPU 201, thus increasing the speed and efficiency of traffic manager 111. In other embodiments, the CPU could have a different number of cores, or the processor could be provided by more than one CPU. Also, more than one compute unit could be presented to an operating system on each core through the use of simultaneous multi-threading or similar.

The level one caches of the cores and the level two cache 306 combine with RAM 202 to provide memory for traffic manager 111. The exact location of instructions and data will vary between embodiments, implementations and particular requirements at any specific time.

FIG. 4

Figure 4:
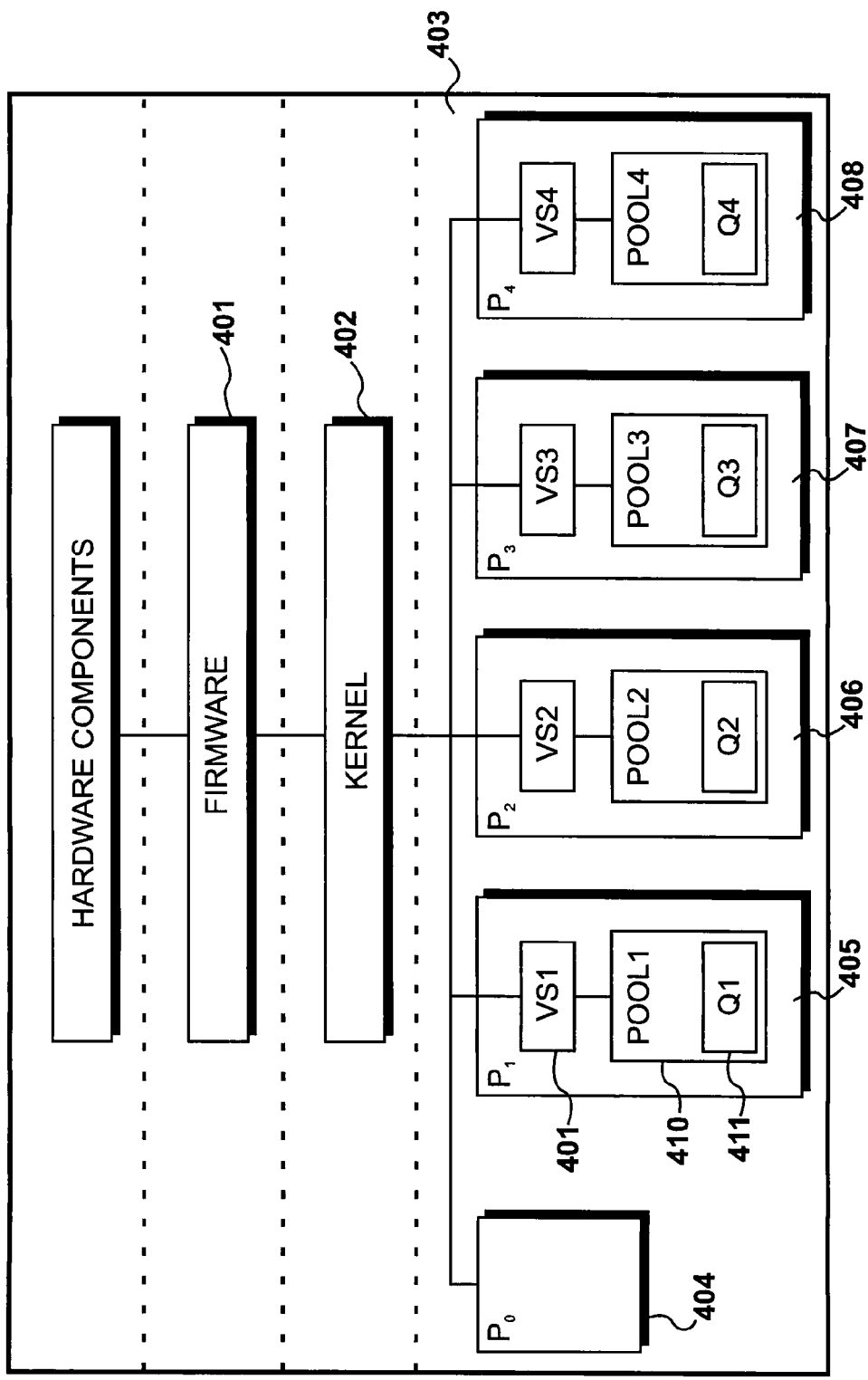
FIG. 4 is an abstraction layer diagram showing the operation of the traffic manager shown in FIG. 1.

An abstraction layer diagram of traffic manager 111 is shown in FIG. 4. On the first level are the hardware components detailed in FIGS. 2 and 3.

At the next level is firmware 401 that receives instructions from a kernel 402 and converts them into machine code executable by the components.

Kernel 402 manages allocation of memory to processes and the scheduling of process threads to CPU 201. Kernel 402 allocates portions of memory to various processes under its control. A portion is allocated as shared memory, which is readable and writable by some participating processes. Some portions are readable and writable only by the kernel 402 itself, and others are only readable and writable by individual processes. Additionally, kernel 402 manages the flow of output data provided by the firmware 401 to processes.

Process layer 403 comprises in this example five processes. Process 404 is a parent process that spawns child processes 405, 406, 407 and 408. In this example, four child processes 405 to 408 are spawned because there are four compute units available. At any one time, each of the compute units may be running threads associated with only one of the child processes 405 to 408.

Each of child processes 405 to 408 receives client requests via kernel 402 and connects or attempts to connect them to one of servers 107 to 110. Child process 405 includes a virtual server 409, which receives requests and performs a first level of processing on each one.

A request is then passed to a pool 410 which manages a collection of servers that are substantially the same. The pool 410 defines the connection limit of the servers that it manages, along with information on connections that child process 405 has made. Pool 410 also includes a queue 411 for requests that cannot be routed to servers because the servers' maximum number of connections has been reached.

Each of child processes 405, 406, 407 and 408 is similar. Each client request is passed to a single child process and each child process manages its own connections and queue.

FIG. 5

Figure 5:
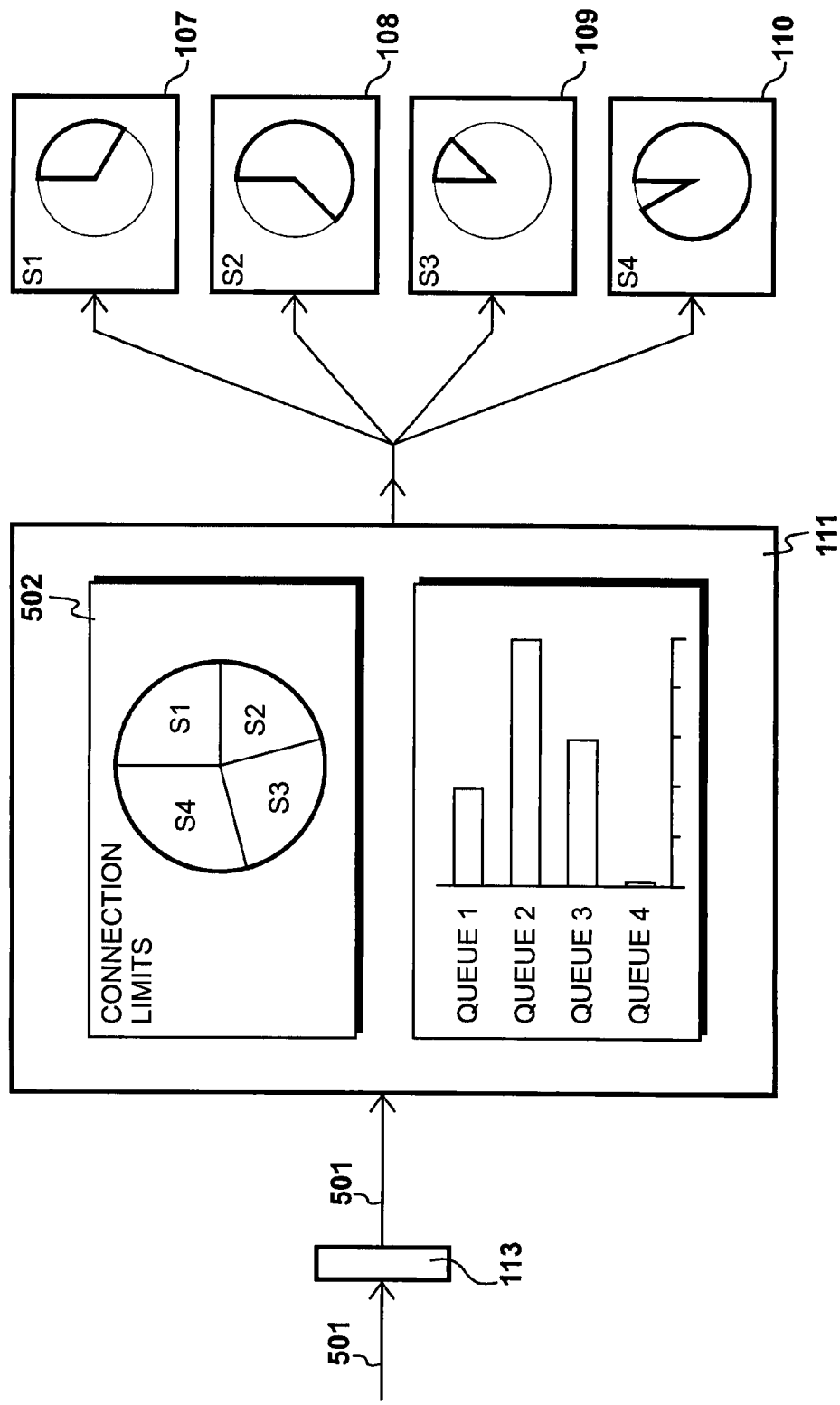
FIG. 5 is a diagram illustrating how requests from clients shown in FIG. 1 are routed to servers shown in FIG. 1 by the traffic manager shown in FIG. 1.

A diagram of how requests received from clients 101 to 104 are routed to servers 107 to 110 is shown in FIG. 5. A request 501 is received at router 113 and is forwarded to traffic manager 111. In shared memory 502, accessible by each of child processes 405 to 408, is held data relating to connection limits, the connections made and the total size of the queue across all the processes. Each of servers 107 to 110 has a connection limit, which is a maximum number of connections it can handle concurrently. If it receives more than this number of requests, it will start queuing them, which could lead to a large queue in one server and no queue in another server. Each of processes 405 to 408 continuously updates the shared memory 502 with the total number of connections it has made across the servers, and thus updates the total queue length (the sum of the queue lengths in each child process). Each child process cannot access the memory allocated to any other child process to find out this information directly.

The four queues, one for each of child processes 405 to 408, are represented graphically inside traffic manager 111. Queue one contains two requests, queue two contains five requests, queue three contains three requests and queue four is empty.

The number of connections made at each of servers 107 to 110 is also shown graphically. Thus for example, server 109 has very few connections, while server 110 is nearly up to its limit. Traffic manager 111 will attempt to de-queue the requests by connecting them to available connection slots on the servers. This is optimised by de-queuing the larger queues faster, so that more requests are connected from larger queues than smaller queues. Thus, in the example shown in FIG. 5, more requests are taken from queue two than queue three, fewer are taken from queue one and currently none at all are taken from queue four.

However, each child process decides individually how many of its queued requests to attempt to de-queue, without any negotiation with other child processes.

FIG. 6

Figure 6:
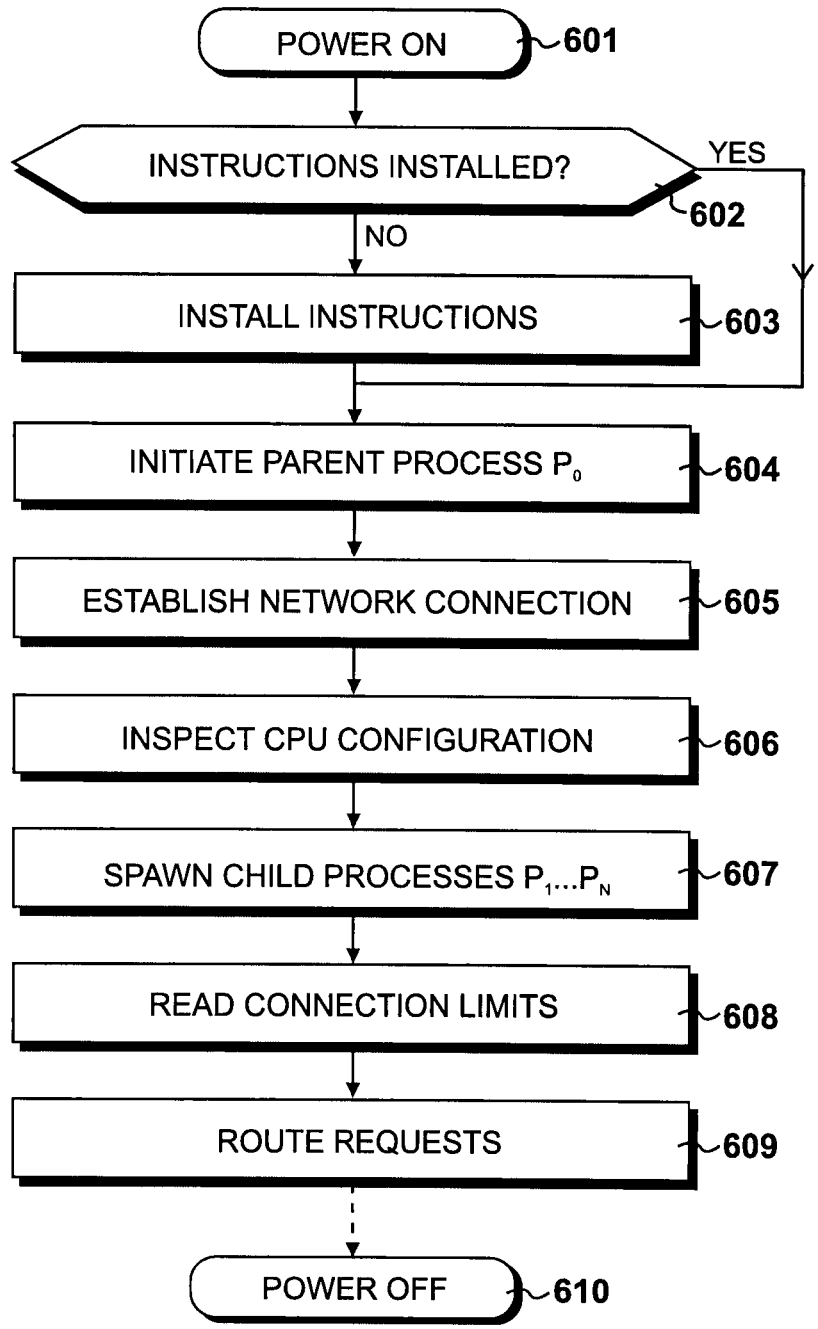
FIG. 6 details steps carried out by the traffic manager shown in FIG. 1 to route requests.

FIG. 6 details steps carried out by traffic manager 111 to route requests from clients 101 to 104 to servers 107 to 110. At step 601 traffic manager 111 is powered on and at step 602 a question is asked as to whether the traffic management instructions are installed; and if this question is answered in the negative then at step 603 the instructions are installed, either from a computer-readable medium such as CD-ROM 204 or from a network such as the Internet.

At step 604 the parent process 404 is initiated and carries out steps of establishing a network connection to network 112 at step 605. Process 404 inspects the configuration of CPU 201 at step 606 and spawns the necessary number of child processes, which in this example is four, at step 607. The number of child processes is dependent on the number of compute units present in the CPU or CPUs on the traffic manager, so that if necessary each child process could be run concurrently by CPU 201. Process 404 then reads server connection limits from a user configuration file and passes to them to the child processes at step 608.

At step 609 client requests are received and routed to the servers. The traffic manager then continues to route requests indefinitely until powered off for any reason at 610. Parent process 404 monitors child processes 405 to 408, and if one of them crashes it spawns a new child process to replace it.

FIG. 7

Figure 7:
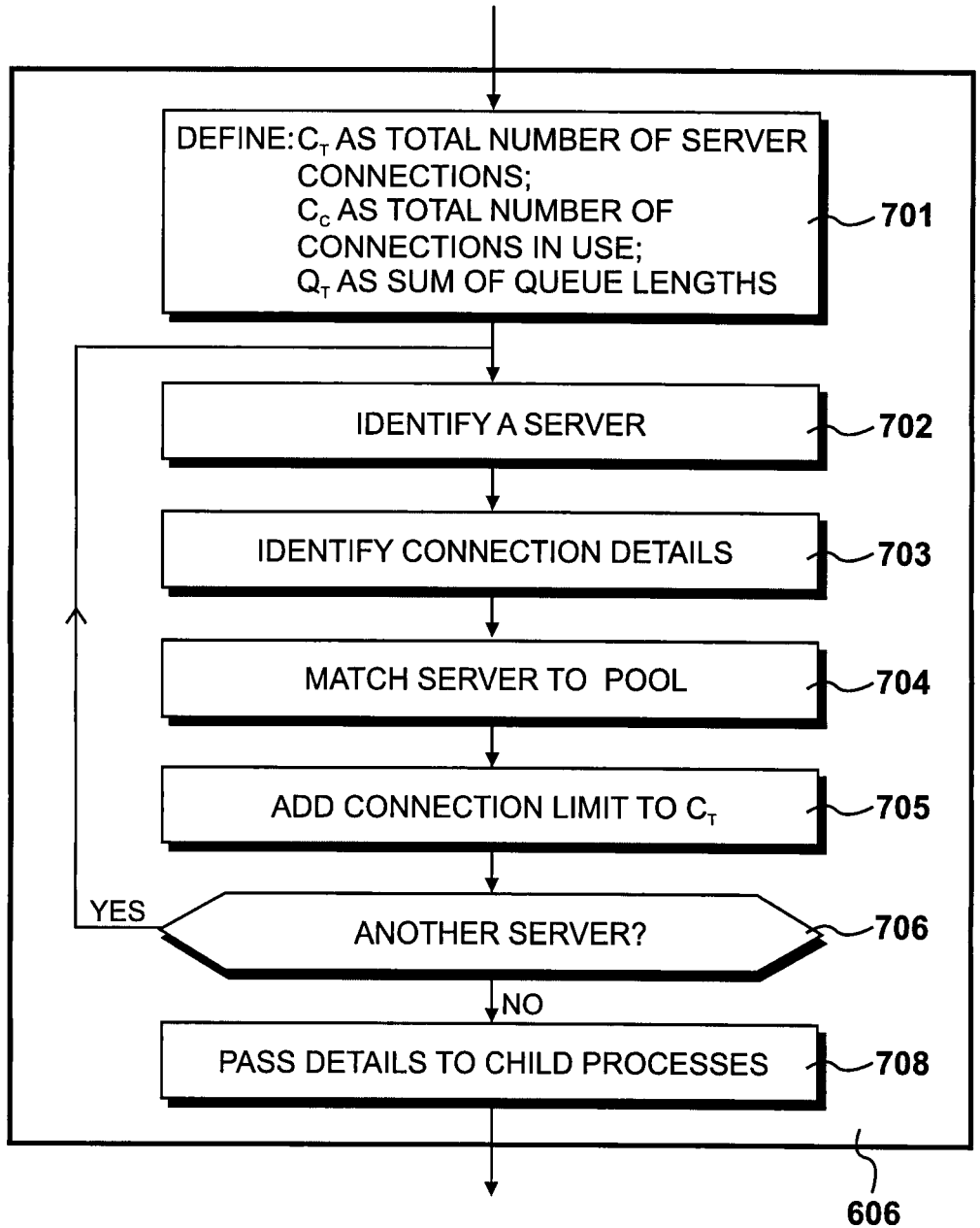
FIG. 7 details steps carried out in FIG. 6 to construct a list of connections.

FIG. 7 details step 606 at which the connection limits are read by process 404. At step 701 a variable $C_T$ is defined as the total number of server connections, i.e. the total connection limit. At step 702 the first server is identified and at step 703 its connection details are identified. These include the IP address and port number of the server and the total number of connections that it can handle. At step 704, the server is matched to its corresponding pool, and the connection limit for the particular pool is queried from a user configuration file. At step 705 the total number of connections the server can handle is added to $C_T$.

At step 706 a question is asked as to whether there is another server on the network, and if this question is answered in the affirmative control is returned to step 702 and the next server is identified. Alternatively, the question is answered in the negative and all the servers have been identified. The total connection limit $C_T$ is therefore known. The details are then passed to the child processes at step 707, whereupon they place the data in shared memory.

FIG. 8

Figure 8:
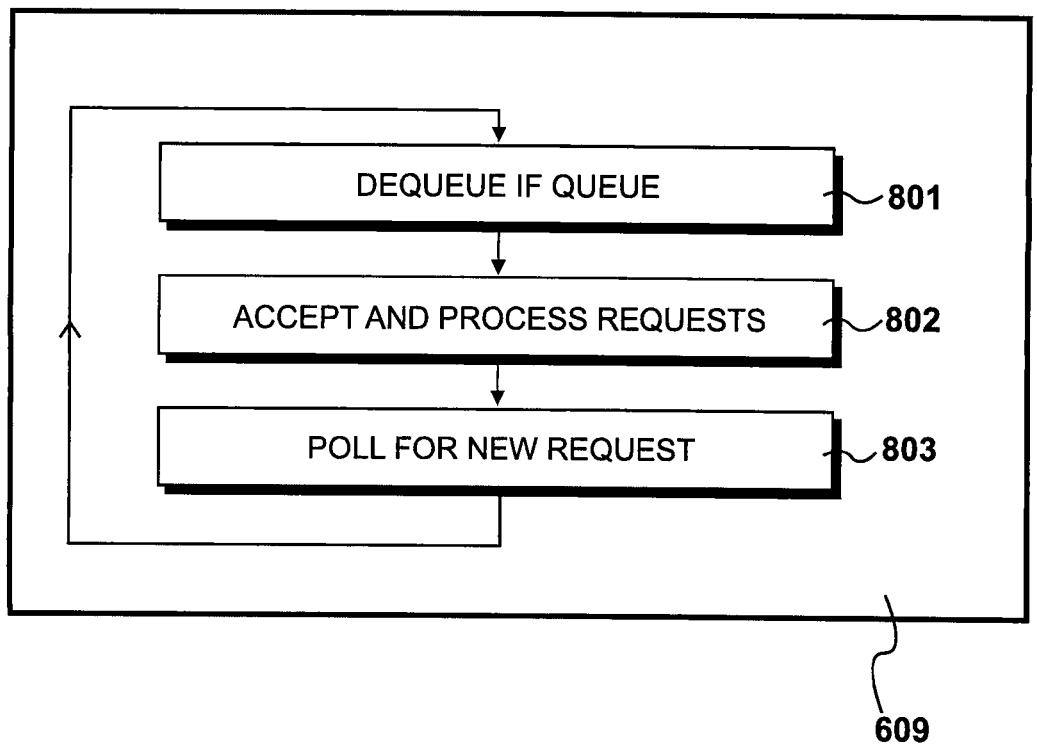
FIG. 8 details steps carried out in FIG. 6 to route requests.

FIG. 8 details step 609 at which requests from clients are routed to server. Each of child processes 405 to 408 carries out these steps individually.

At step 801, the child process checks to see if it has an empty queue, and if it does not it attempts to dequeue a certain number of requests. At step 802, it accepts and processes a batch of requests that have been passed to the child process by kernel 402. At step 803, the child process polls for new requests for a period of time determined, in part, by its queue size. When the polling period is over, control is returned to step 801.

FIG. 9

Figure 9:
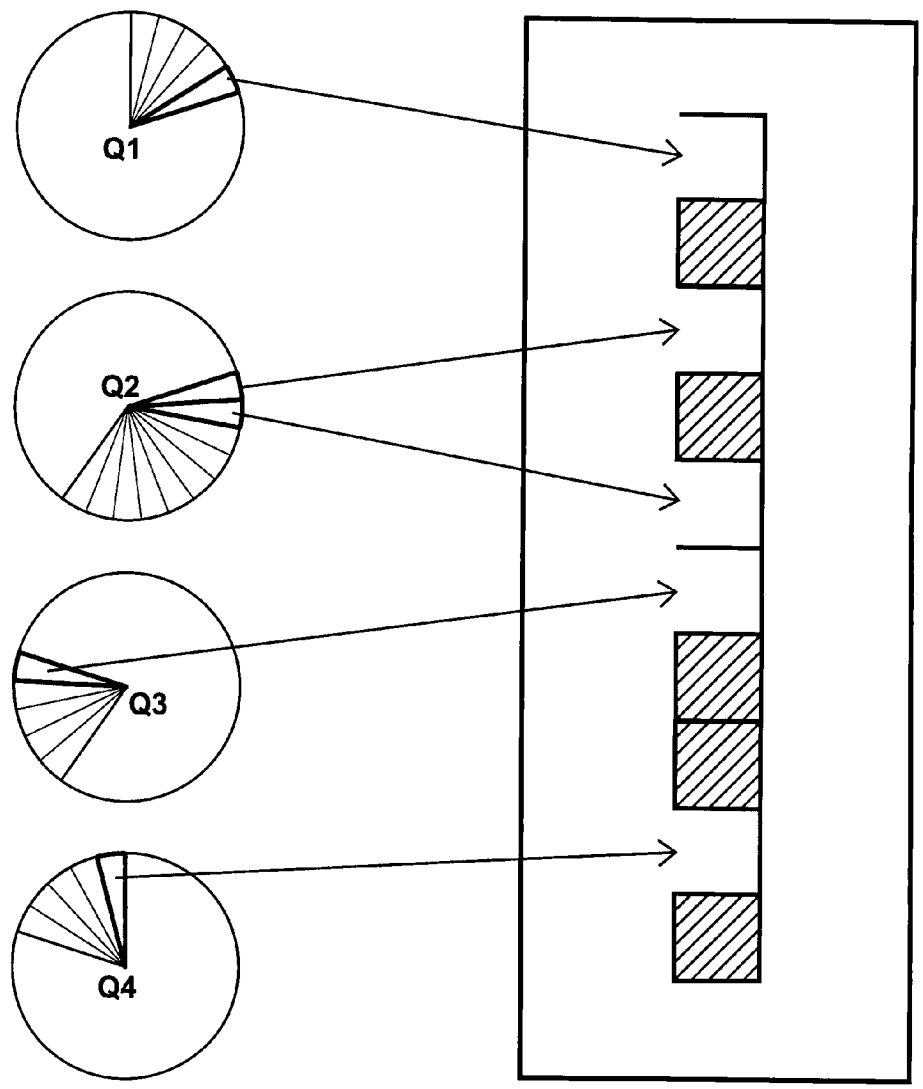
FIG. 9 illustrates how the processes is shown in FIG. 4 select a number of requests to remove from their queues and connect to servers.

Each child process calculates a number of requests that it will attempt to de-queue before accepting a new batch of requests. The calculation each child process carries out is given in FIG. 9. The child process calculates the number of available connections from information available in shared memory, multiplies it by its own queue length, and divides the total by the total queue size (sum of all queue lengths), also available from shared memory.

Thus, as an example, suppose queues one, three and four all have five requests, and queue two has ten requests. Across all the servers, five connections are available. Based on this, the child processes having queues one, three and four will each attempt to de-queue only one request, while the child process with queue two will attempt to de-queue two requests. By only using data available in shared memory, an optimal de-queuing algorithm is achieved without any negotiation between the child processes 405 to 408 administering the queues.

FIG. 10

Figure 10:
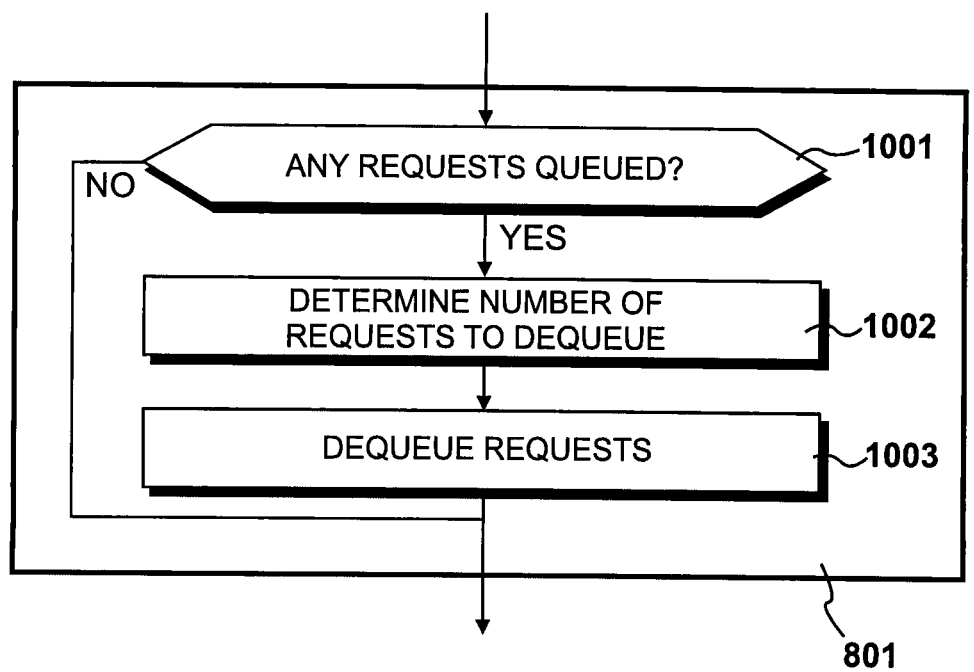
FIG. 10 details steps carried out in FIG. 8 to de-queue requests.

FIG. 10 details step 801 at which requests are de-queued. At step 1001a question is asked as to whether there are any requests in the queue, and if this question is answered in the affirmative the number of requests to de-queue is determined at step 1002. An attempt is made to de-queue this number of requests at step 1003.

If the question asked at step 1001 is answered in the negative, to the effect that there are no requests in the queue, then step 801 is finished.

FIG. 11

Figure 11:
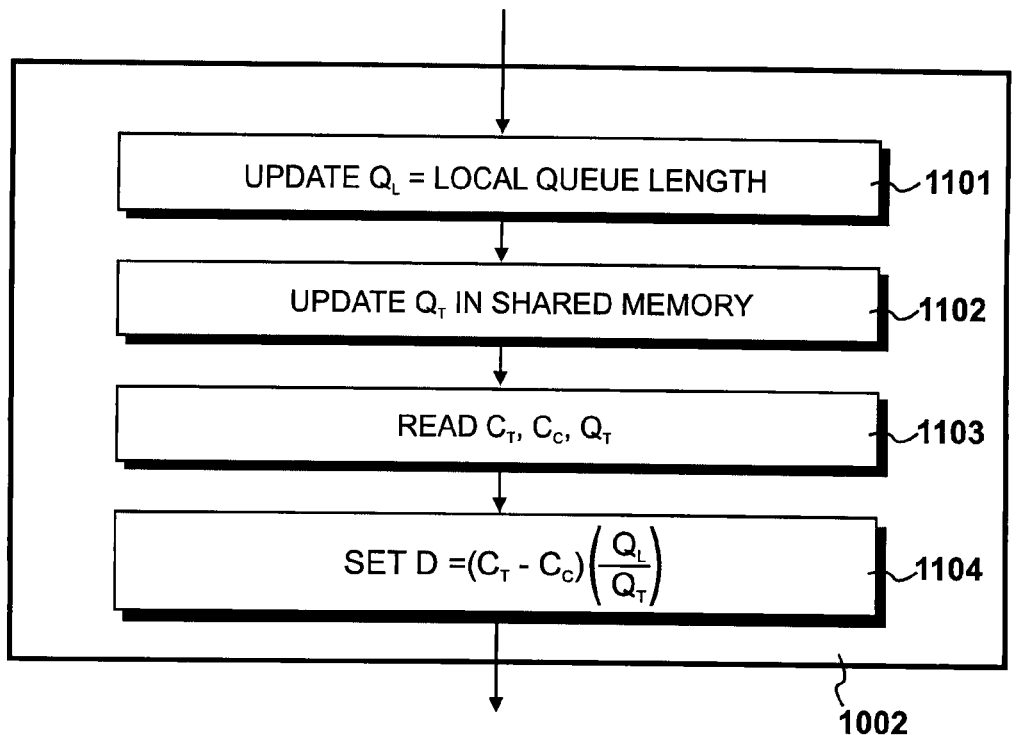
FIG. 11 details steps carried out in FIG. 10 to determine a number of requests to de-queue.

FIG. 11 details step 1002 at which the number of requests to be de-queued is calculated. At step 1101 a variable $Q_L$ is updated, which is the number of requests in the queue, or local queue length. At step 1102, $Q_T$ (the total of all the processes' queue lengths) is updated in the shared memory to reflect any change in the local queue length. At step 1103 $C_T$, the total connection limit, $C_C$, the total number of connections in use, and $Q_T$, the total queue length, are read from shared memory. At step 1104 the variable D is set to be the product of the number of available connections, as defined by $C_T$ minus $C_C$, and the local queue length $Q_L$, divided by the total queue length $Q_T$. This is the number of requests that the child process will attempt to de-queue.

FIG. 12

Figure 12:
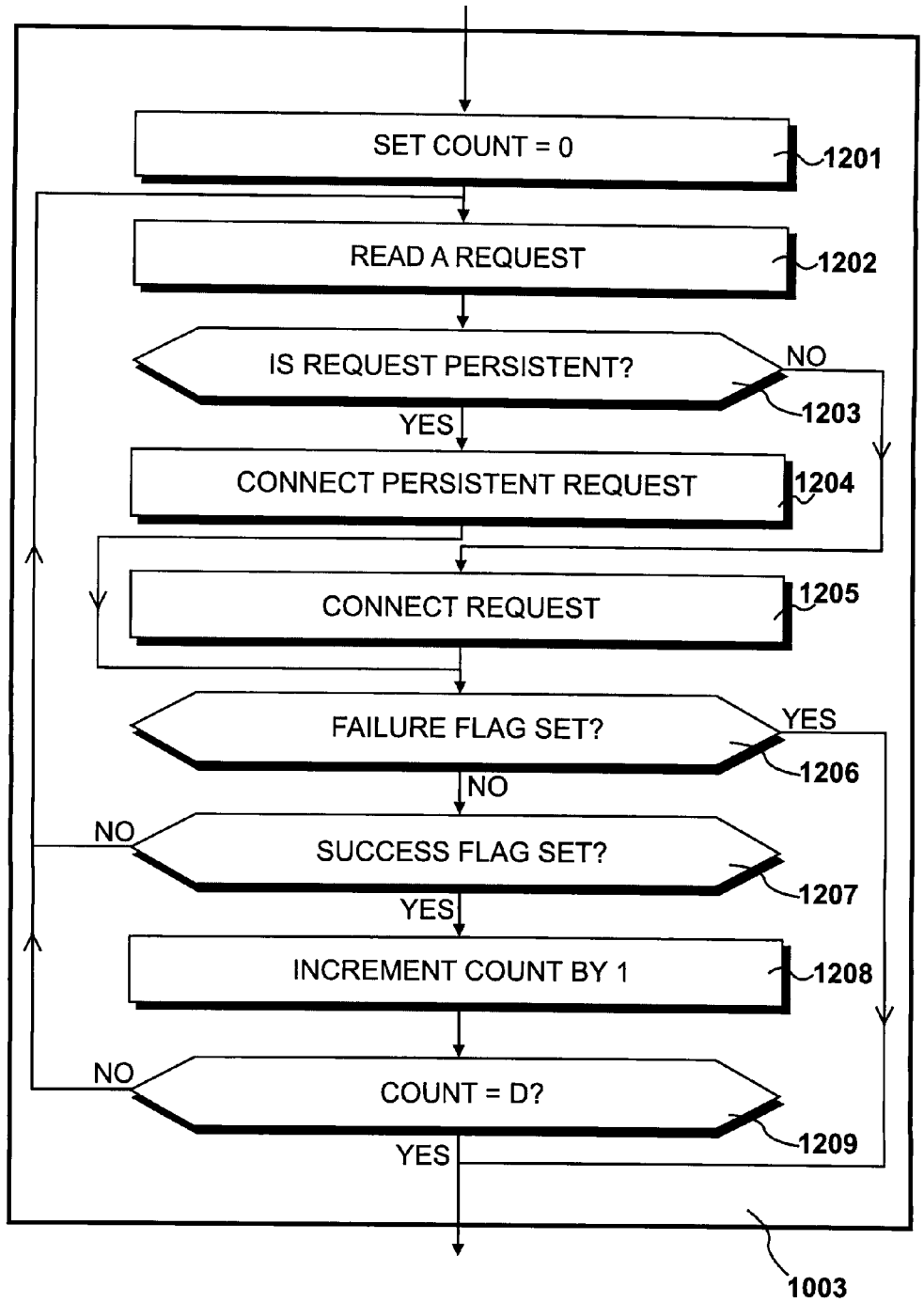
FIG. 12 details steps carried out in FIG. 10 to de-queue requests.

FIG. 12 details step 1003 at which a number of requests determined in step 1002 is dequeued. The queue is ordered, and the dequeuing begins from the first request in the queue. At step 1201, a counter is set to zero, and at step 1202 a queued request is read. At step 1203, a question is asked as to whether the request has a persistent attribute set, indicating that it is to be connected to a particular server. If this question is answered in the affirmative, the persistent request is connected to its server at step 1204. The process by which the request is connected to its server will be described further with reference to FIG. 13. If the question is asked at step 1203 is answered in the negative, to the effect that the request does not have a persistent attribute set, then the request is connected to a server at step 1205. The process by which the request is connected will be described further with reference to FIG. 14. At step 1206, a question is asked as to whether a failure flag has been set, indicating that the connection of the request was unsuccessful. If this question is answered in the affirmative, then step 1003 is finished. If the question asked at step 1206 is answered in the negative, a question is asked at step 1207 as to whether a success flag has been set. If this question is answered in the negative, control is returned to step 1202 where a further request is read. If the question asked at step 1207 is answered in the affirmative, the counter is incremented by one. At step 1209, a question is asked as to whether the counter is equal to D, the number of requests to be dequeued. If this question is answered in the negative, control is returned to step 1202 and another request is connected. If it is answered in the affirmative than the prescribed number of requests have been dequeued and step 1003 is complete.

FIG. 13

Figure 13:
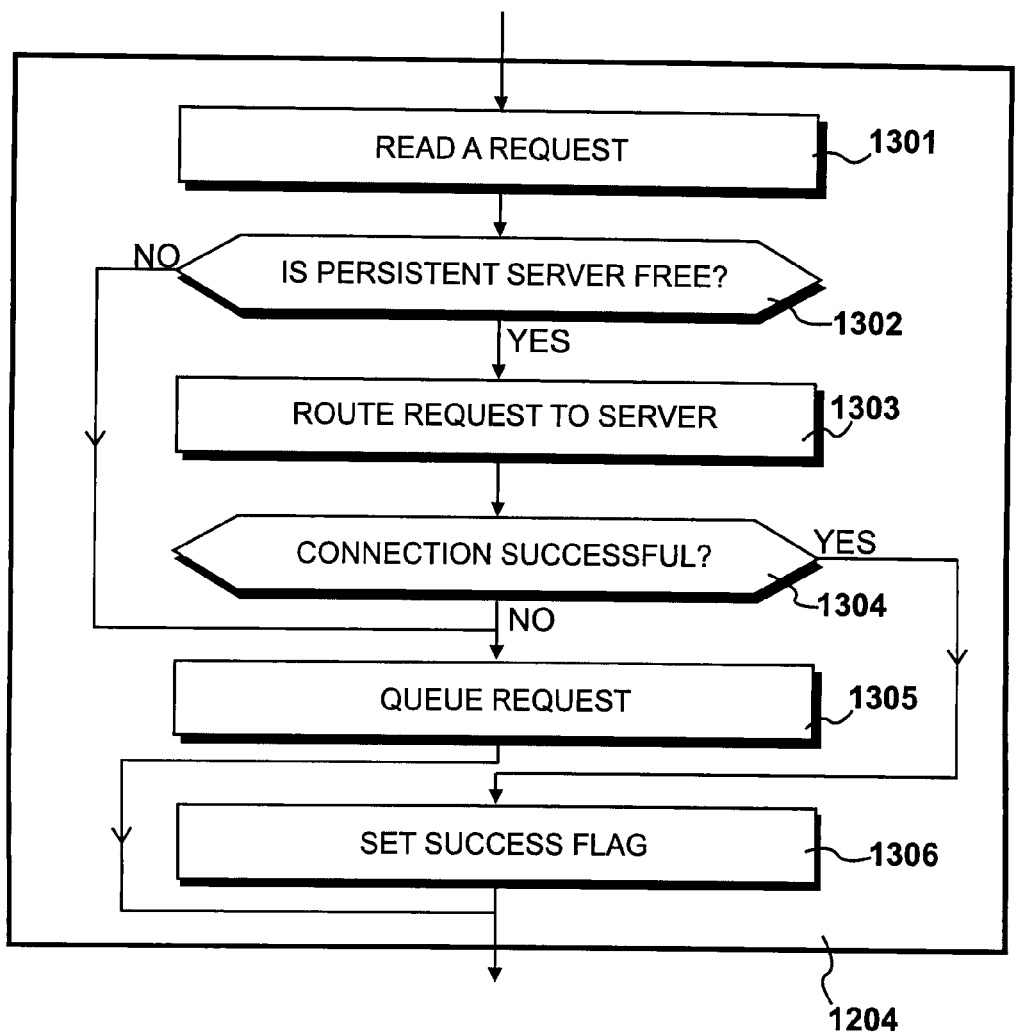
FIG. 13 details steps carried out in FIG. 12 to connect a request.

FIG. 13 details steps carried out during step 1204 to connect a persistent request. At step 1301 a request is read to ascertain which server the request is to be routed to, and at step 1302 a question is asked as to whether the request's persistent server is free. If this question is answered in the negative, then the request is queued at step 1305 and step 1204 is finished. If the question asked at step 1302 is answered in the affirmative, then at step 1303 the request is routed to the persistent server. At step 1304, a question is asked as to whether the connection was successful. If this question is answered in the negative, to the effect that the connection was not completed, then the request is queued at step 1305 and step 1204 is finished. If the question asked at step 1304 was answered in the affirmative, then a success flag is set at step 1306 and step 1204 is finished.

FIG. 14

Figure 14:
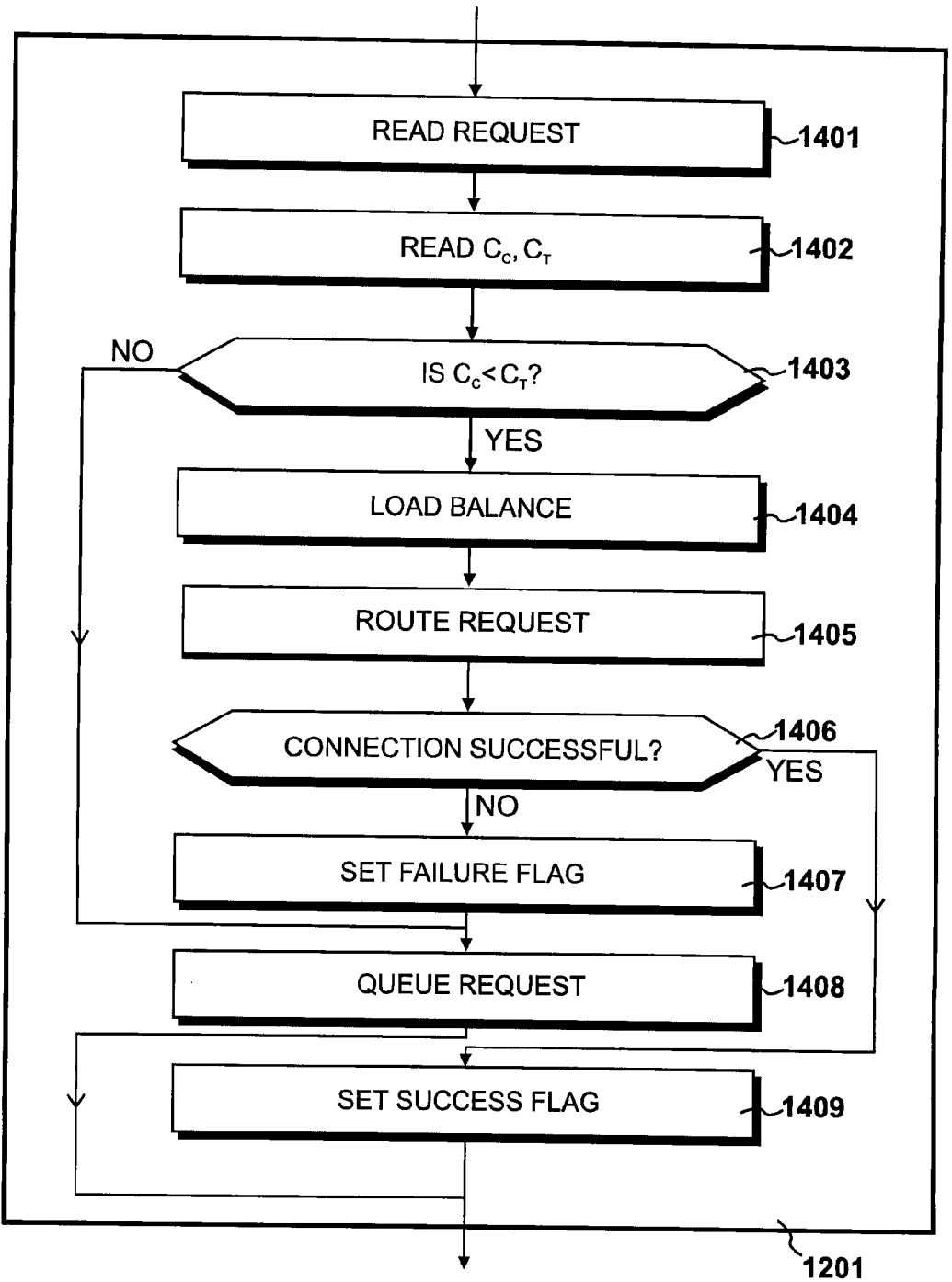
FIG. 14 details steps carried out in FIG. 8 to accept a batch of requests.

FIG. 14 details steps carried out during step 1205 to connect a request. At step 1401, a request is read and at step 1402 the variables $C_C$ and $C_T$ are read from shared memory. At step 1406, a question is asked as to whether the value of $C_C$ is less than $C_T$, and if this question is answered in the negative, the request is requeued at step 1408 and step 1205 is complete. If the question asked at step 1403 is answered in the affirmative, to the effect there are free connections, a load balancing algorithm determines the best choice of server to which the request should be sent, and at step 1405 the request is routed to the selected server. At step 1406, a question is asked as to whether the connection was successful and if answered in the negative, a failure flag is set at step 1407. At step 1408 the request is placed in the queue and step 1205 is finished. If the question asked at step 1406 is answered in the affirmative, then a success flag is set at step 1409 and step 1205 is finished.

FIG. 15

Figure 15:
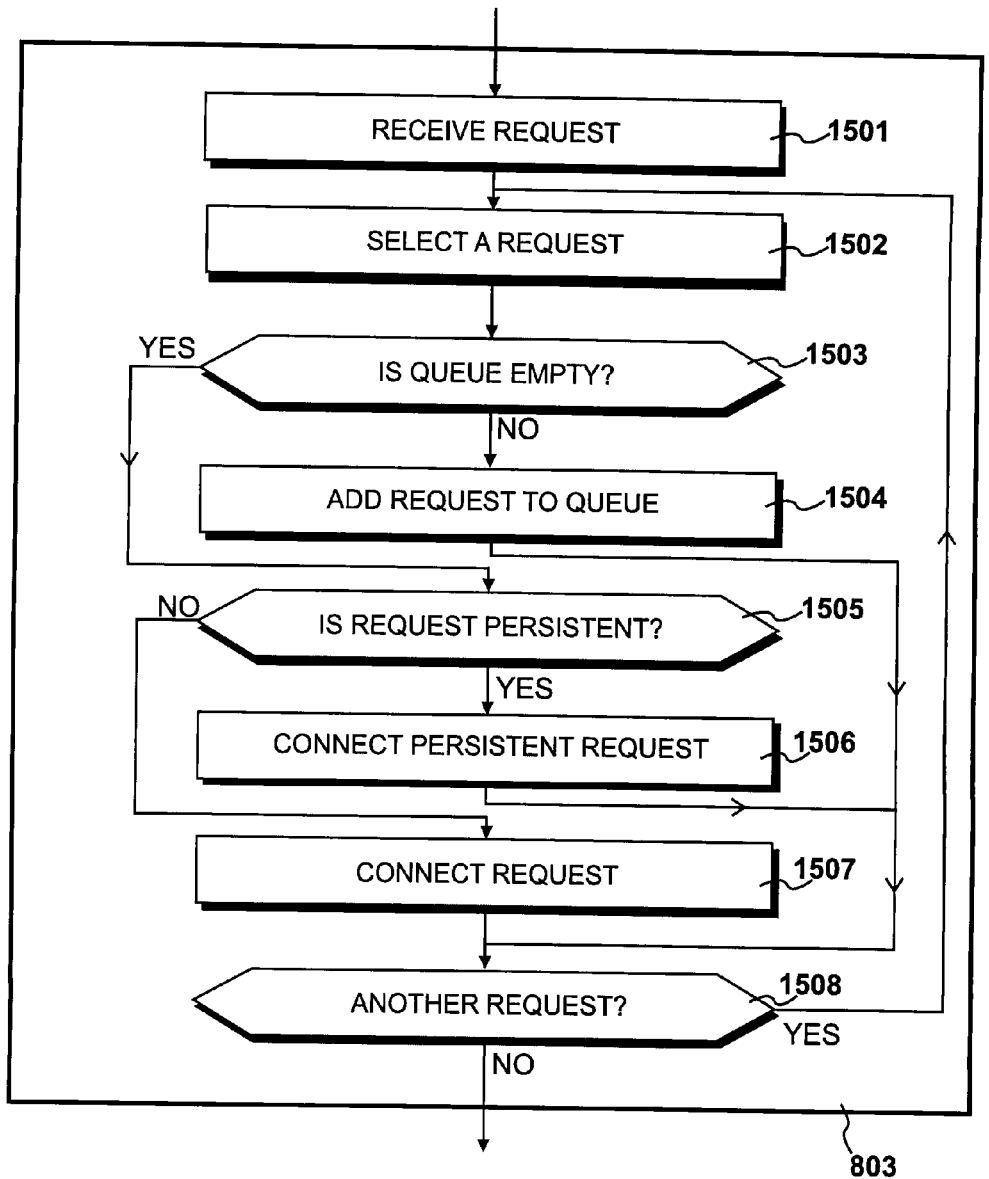
FIG. 15 details steps carried out in FIG. 8 to process requests.

FIG. 15 details step 802 in which requests are accepted and processed by child process 405. At step 1501, requests are received from kernel 402 and at step 1502 a request is selected. At step 1503, a question is asked as to whether the queue is empty and if this question is answered in the negative, then the selected request is added to the queue at step 1504. If the question asked at step 1503 is answered in the affirmative, to the effect that the queue is empty, then a question is asked at step 1505 as to whether the request has a persistent attribute set. If this question is answered in the affirmative, then at step 1506 the persistent request is connected and control proceeds to step 1508. The operations carried out during step 1506 are the same as previously described with reference to FIG. 13. If the question asked at step 1505 is answered in the negative, to the effect that the request did not have a persistent attribute set, the request is connected to a server at step 1507. Operations carried out during step 1507 are the same as previously described with reference to FIG. 14. At step 1508 a question is asked as to whether there are any more requests to be processed and if this question is answered in the affirmative, control is returned to step 1502 where a further request is selected. If the question asked at step 1508 is answered in the negative, to the effect that all received requests have been processed, then step 802 is finished.

Thus at the end of step 802, all of the requests accepted at step 1501 have either been queued or connected. After polling for new requests at step 803, the child process will then attempt to dequeue a number of requests at step 801.

FIG. 16

Figure 16:
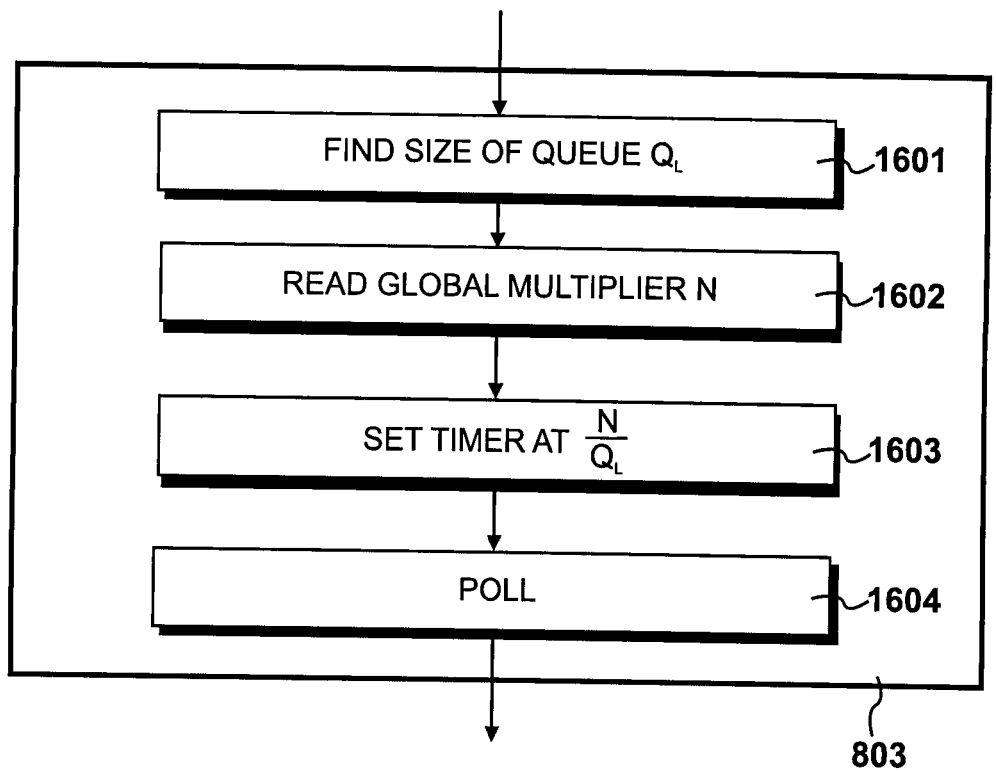
FIG. 16 details steps carried out in FIG. 8 to poll.

FIG. 16 details step 803 at which the child process polls for new requests. At step 1601 the size of its queue $Q_L$ is discovered and at step 1602 a variable N, which is a multiplier common to all the processes, is read from shared memory. At step 1603, the variable N is divided by the queue size $Q_L$ to find a value in milliseconds for a poll timer. In the event that the queue size $Q_L$ is zero, which would result in the calculation returning an undefined value, then the child process sets the poll timer at a value in milliseconds equal to the variable N. At step 1604 the child process polls for this number of milliseconds.

By carrying out the calculation at step 1603, the timer is inversely proportional to the length of the child process' queue, meaning that a child process having a large queue will poll for a shorter amount of time than one having a small or no queue. Since the length of time for which a child process polls directly affects the number of requests it accepts at its next iteration of step 802, a child process with a larger queue will accept fewer requests than a child process with a smaller queue, balancing queue lengths across the child processes.

The steps detailed in FIGS. 8 to 15 are carried out independently by each of child processes 405 to 408. Each of the child processes manages its queue, accepts requests and processes requests without any negotiation with the other child processes. However, due to the algorithm described herein, each process reduces its queue by a number that takes account of the other processes' queues using total queue length information available from shared memory, without actually knowing how large the individual queues are. Each process also individually takes steps to balance out the queues by the setting of its own poll timer.

The invention claimed is:

1. Apparatus for routing requests from a plurality of connected clients to a plurality of connected servers, comprising a processor, memory and a network interface, wherein said processor is configured to:
    run a plurality of identical processes, each process being for receiving requests and connecting each received request to a server, thereby creating a plurality of connections;
    maintain data in memory indicating, for each server, a maximum number of connections it can service, thereby defining a global maximum number of serviceable connections across said plurality of servers, such that at any time the number of available connections is determined by the difference between said global maximum and the number of connections;
    and when running one of said processes:
    maintain a queue of requests in memory,
    determine a number of queued requests that may be connected to a server,
    attempt to connect said number of queued requests;
    accept further requests, and
    if said queue is not empty, place said further requests in said queue, and if said queue is empty, attempt to connect said further requests;
    wherein said processor determines said number of queued requests that may be connected to a server in dependence upon the length of the queues of all the processes, queue length of said queue, and the number of available connections.

2. The apparatus of claim 1, wherein the number of said identical processes is equal to the number of computation units presented by said processor.

3. The apparatus of claim 1, wherein each of said plurality of identical processes periodically updates data in memory indicating the number of requests in its queue and its number of connections.

4. The apparatus of claim 1, wherein said processor, when running one of said processes, accepts further requests in batches.

5. The apparatus of claim 4, wherein said processor, when running one of said processes, determines the size of said batches in dependence upon the number of requests in said queue.

6. The apparatus of claim 1, wherein said processor, when running one of said processes, is further configured to:
    inspect said queued requests for a persistent attribute, said persistent attribute defining a persistent server that must serve a particular request;
    identify a request as a persistent request if said request comprises said persistent attribute; and
    attempt to connect said persistent request to its persistent server if the number of connections to said server is not in excess of the maximum number of connections it can service.

7. The apparatus of claim 6, wherein said processor, when running one of said processes, is further configured to leave said persistent request in said queue if said persistent server is unable to service said persistent request.

8. A method of routing requests from a plurality of connected clients to a plurality of connected servers, comprising the steps of:
    ascertaining, for each of said plurality of connected servers, a maximum number of connections it can service, thereby defining a global maximum number of serviceable connections, such that at any time the number of available connections is determined by the difference between said global maximum and the number of connections,
    receiving requests from said plurality of connected clients,
    maintaining a plurality of queues for queuing said requests,
    selecting a queue containing queued requests,
    determining a number of queued requests that may be connected to a server,
    attempting to connect said number of queued requests,
    receiving further requests, and
    if said queue is not empty, placing said further requests in said queue, and if said queue is empty, attempting to connect said further requests;
    wherein said number of queued requests that may be connected to a server is determined in dependence upon the length of each of said plurality of queues, queue length of said queue, and the number of available connections.

9. The method of claim 8, wherein said step of receiving further requests further comprises the steps of, for each of the queues:
   accepting a batch of further requests, and,
   placing in said queue said further requests.

10. The method of claim 9, wherein said step of accepting a batch of further requests further comprises the steps of, for each of the queues:
   determining the length of a queue,
   accepting a number of further requests determined by the length of the queue.

11. The method of claim 8, further comprising the steps of:
   inspecting said queued requests for a persistent attribute, said persistent attribute defining a persistent server that must serve a particular request;
   identifying a request as a persistent request if said request comprises said persistent attribute; and
   attempting to connect said persistent request to its persistent server if the number of connections to said server is not in excess of the maximum number of connections it can service.

12. The method of claim 11, further comprising the step of leaving said persistent request in said queue if said persistent server is unable to service said persistent request.

13. A non-transitory computer-readable medium storing instructions that, when executed by a computer, cause the computer to perform a method of routing requests from a plurality of connected clients to a plurality of connected servers, comprising the steps of:
   ascertaining, for each of said plurality of connected servers, a maximum number of connections it can service, thereby defining a global maximum number of serviceable connections, such that at any time the number of available connections is determined by the difference between said global maximum and the number of connections,
   receiving requests from said plurality of connected clients,
   maintaining a plurality of queues for queuing said requests,
   selecting a queue containing queued requests,
   determining a number of queued requests that may be connected to a server,
   attempting to connect said number of queued requests,
   receiving further requests, and
   if said queue is not empty, placing said further requests in said queue, and if said queue is empty, attempting to connect said further requests;
   wherein said number of queued requests that may be connected to a server is determined in dependence upon the length of each of said plurality of queues, queue length of said queue, and the number of available connections.

14. An apparatus, comprising:
   one or more processors; and
   a non-transitory computer-readable medium storing instructions that, when executed by said one or more processors, cause the apparatus to perform a method of routing requests from a plurality of connected clients to a plurality of connected servers, comprising the steps of:
   ascertaining, for each of said plurality of connected servers, a maximum number of connections it can service, thereby defining a global maximum number of serviceable connections, such that at any time the number of available connections is determined by the difference between said global maximum and the number of connections,
   receiving requests from said plurality of connected clients,
   maintaining a plurality of queues for queuing said requests,
   selecting a queue containing queued requests,
   determining a number of queued requests that may be connected to a server,
   attempting to connect said number of queued requests,
   receiving further requests, and
   if said queue is not empty, placing said further requests in said queue, and if said queue is empty, attempting to connect said further requests;
   wherein said number of queued requests that may be connected to a server is determined in dependence upon the length of each of said plurality of queues, queue length of said queue, and the number of available connections.

* * * * *